United States Patent [19]

Vane

[11] Patent Number: 5,445,693
[45] Date of Patent: Aug. 29, 1995

[54] METHOD OF PRODUCING A FORMABLE COMPOSITE MATERIAL

[76] Inventor: Jeffrey A. Vane, 12 Cleveland Grove, Northcourt Park, Newbury, Berkshire RG13 IXF, England

[21] Appl. No.: 227,474
[22] Filed: Apr. 14, 1994

Related U.S. Application Data

[63] Continuation of Ser. No. 938,521, Sep. 2, 1992, abandoned, which is a continuation-in-part of Ser. No. 666,589, Mar. 8, 1991, abandoned, which is a continuation of Ser. No. 411,363, Sep. 25, 1989, abandoned.

[30] Foreign Application Priority Data

Sep. 26, 1989 [GB] United Kingdom ............... 8822521

[51] Int. Cl.$^6$ ............ B32B 7/08; B32B 31/16; B32B 31/26
[52] U.S. Cl. ............ 156/93; 28/283; 66/84 R; 66/169 R; 66/169 A; 156/148; 156/179; 156/181; 428/109; 428/110; 428/111; 428/113; 428/218; 428/373
[58] Field of Search ............ 156/92–93, 156/179, 181, 148; 66/84 R, 85 R, 84 A, 169 R, 169 A; 28/283; 428/109–111, 113, 218, 373

[56] References Cited

U.S. PATENT DOCUMENTS

| | | | |
|---|---|---|---|
| 3,519,509 | 7/1970 | Gidge et al. | 156/441 X |
| 3,737,352 | 6/1973 | Avis et al. | 156/181 |
| 3,761,345 | 9/1973 | Smith | 66/84 A |
| 4,043,703 | 8/1977 | Carlson | 156/179 X |
| 4,110,505 | 8/1978 | Prewo | 156/179 X |
| 4,293,019 | 10/1981 | Maiocchi | 152/527 |
| 4,409,273 | 10/1983 | Weitzel | 428/109 |
| 4,410,385 | 10/1983 | Murphy et al. | 156/181 |
| 4,416,929 | 11/1983 | Krueger | 428/102 |
| 4,484,459 | 11/1984 | Hutson | 66/84 A |
| 4,556,440 | 12/1985 | Krueger | 66/84 A X |
| 4,614,678 | 9/1986 | Ganga | 428/373 X |
| 4,622,254 | 11/1986 | Nishimura et al. | 428/113 X |
| 4,626,461 | 12/1986 | Prewo et al. | 428/113 |
| 4,698,276 | 10/1987 | Duval | 428/218 X |
| 4,770,915 | 9/1988 | Nakagawa et al. | 428/373 X |
| 4,799,985 | 1/1989 | McMahon et al. | 28/283 X |
| 4,818,318 | 4/1989 | McMahon et al. | 28/283 X |
| 5,014,755 | 5/1991 | Bompard et al. | 428/111 X |
| 5,055,242 | 10/1991 | Vane | 156/148 X |
| 5,063,099 | 11/1991 | Tedesco et al. | 428/109 |

FOREIGN PATENT DOCUMENTS

| | | | |
|---|---|---|---|
| 0033244 | 8/1981 | European Pat. Off. . | |
| 0133340 | 2/1985 | European Pat. Off. . | |
| 2927653 | 1/1981 | Germany . | |
| 2010375 | 6/1983 | Germany | 156/93 |
| 3147228 | 6/1983 | Germany . | |
| 3702936 | 8/1988 | Germany | 428/113 |
| 0133042 | 7/1984 | Japan . | |
| 63-183836 | 7/1988 | Japan | 156/179 |
| 1174824 | 12/1969 | United Kingdom . | |
| 1200342 | 7/1970 | United Kingdom | 156/179 |
| 2048165 | 12/1980 | United Kingdom | 156/179 |
| 2067612 | 7/1981 | United Kingdom | 156/167 |
| 2085938 | 5/1982 | United Kingdom | 428/113 |
| WO80/02253 | 10/1980 | WIPO . | |

OTHER PUBLICATIONS

Translation of *Chemiefasern/Textilindustrie*, 36/88, Jul.–Aug., 1986, pp. 579–580.
COFAB Advertisement, 1984.
"Solventless Fabrication of Reinforced Composites", *NASA Tech Briefs*, Fall 1982, p. 98.
4533 Composites, 25 (1985) Jul.–Aug., No. 4, Paris, France, pp. 67–69.
Patent Abstracts of Japan, vol. 9, No. 294 (M–431), Nov. 20, 1985; Japanese Patent Document No. 60-131304, dated Jul. 13, 1985, Yokohama Gomu KK.
Patent Abstracts of Japan, vol. 10, No. 33 (M–452)[2090], Feb. 8, 1986: Japanese Patent document No. 60-187534, dated Sep. 25, 1985, Mitsui Kensetsu K.K.

*Primary Examiner*—Adrienne Johnstone
*Attorney, Agent, or Firm*—Finnegan, Henderson, Farabow, Garrett & Dunner

[57] ABSTRACT

The invention provides a method of providing a formable composite material comprising providing a reinforcing material (9) having a plurality of superimposed layers (1–6), each layer consisting of a plurality of unidirectional non-woven yarns or threads (10) laid side-by-side, the yarns or threads in at least some of the different layers extending in different directions, said layers being stitched (12) together, and before said stitching incorporating in or with the reinforcing material (9) a matrix material (7, 8).

16 Claims, 1 Drawing Sheet

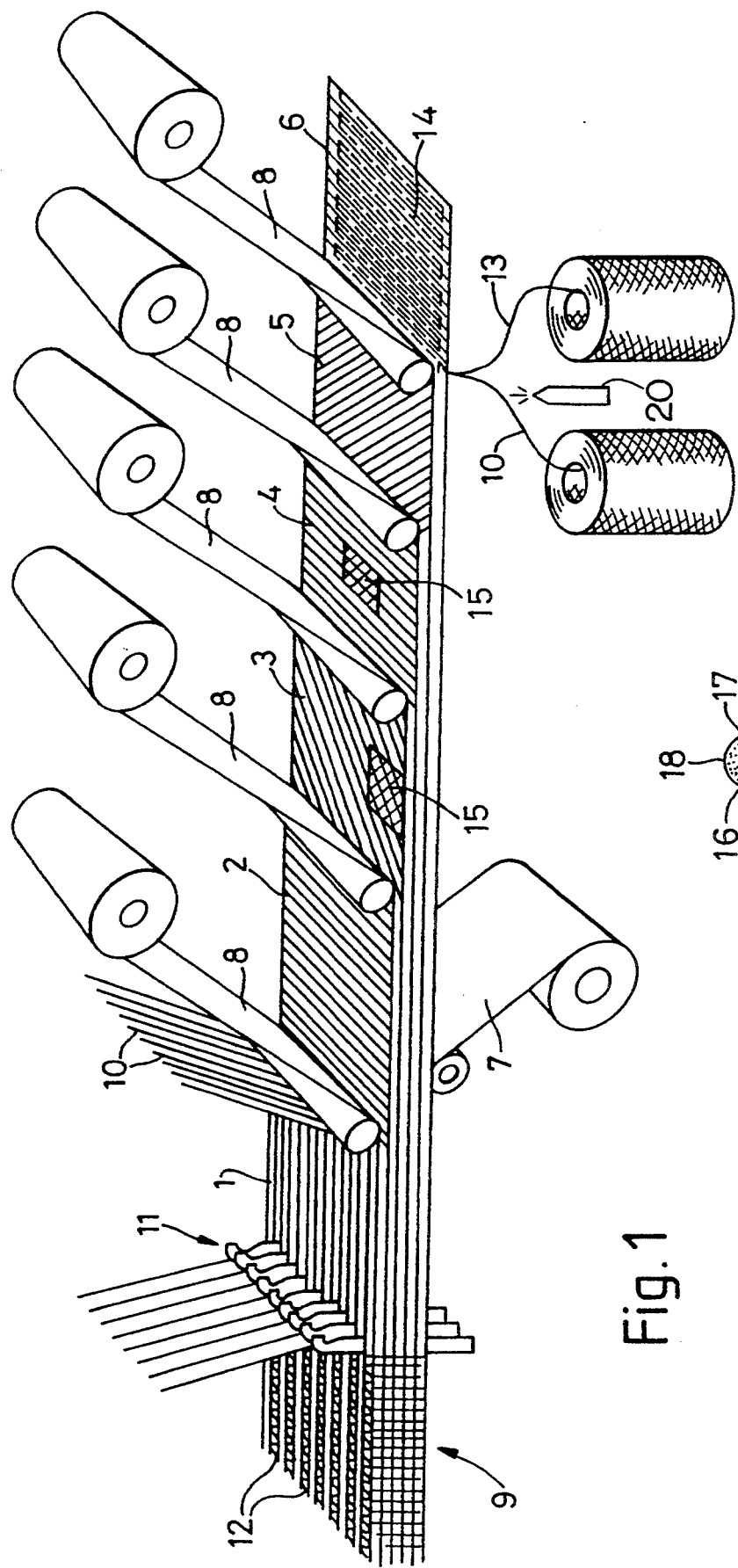

METHOD OF PRODUCING A FORMABLE COMPOSITE MATERIAL

This application is a continuation of application Ser. No. 07/938,521, filed Sep. 2, 1992, now abandoned, which was a continuation-in-part of application Ser. No. 07/666,589, filed Mar. 8, 1991, abandoned; which was a continuation of application Ser. No. 07/411,363, filed Sep. 25, 1989, abandoned.

The present invention relates to a method of producing formable composite materials, e.g., for forming reinforced plastics or other articles.

It is known to produce formable composite materials, in the form of so-called "pre-pregs", which comprise a mat of woven or non-woven glass fibres or other reinforcing material impregnated with a synthetic resin matrix material. Such known formable composite materials suffer from the disadvantages that the distribution of the fibres in a non-woven mat is random and cannot be controlled, so that the strength characteristics of an article formed therefrom can be unpredictable, that in woven mats the weft and warp are crimped where they intersect one another which reduces the strength thereof, and that they have a limited shelf life.

The present invention has as its object to provide a continuous method of producing a formable composite material in which the reinforcing material is multi-axial and can be "engineered" to suit particular applications and which, according to a preferred embodiment, has an indefinite shelf life.

The present invention provides a method of producing a formable composite material comprising producing a reinforcing material having a plurality of superimposed layers, each layer consisting of a plurality of unidirectional non-woven yarns or threads laid side-by-side, the yarns or threads in at least some of the different layers extending in different directions, said layers being stitched together, and before said stitching incorporating in or with the reinforcing material a matrix material.

Preferably, said layers are stitched together by knitting therethrough and the yarns or threads in each of said layers are held by said stitching in fixed relation to one another.

The matrix material may be a plastics material, e.g. a thermoplastic or thermosetting resin, or a metal, ceramics or other material which during subsequent forming of the composite material e.g., under heat and pressure, will consolidate to form a matrix around the reinforcing material.

A sheet, film, ribbon tape or tissue of woven or non-woven material, e.g., a foamed material or a polyester or other thermoset plastics material, may be interposed between two or more of said layers and/or applied to at least one outer surface of the reinforcing material, and stitched in with said layers, to impart required properties to the composite material.

According to a preferred embodiment of the present invention, said matrix material is at least one film, sheet, ribbon, tape or tissue of thermoplastic material which is interposed between at least two of said layers and/or is applied to one or both outer surfaces of the superimposed layers, and is stitched in with said layers. Advantageously a said film, sheet, ribbon, tape or tissue of thermoplastic material is interposed between each of the adjacent layers of the reinforcing material. Such a composite material can have an indefinite shelf life, is easy to store and to handle, and is simple to use since the composite material simply needs heating prior to forming to soften the thermoplastic material and allow flow to wet the reinforcing material prior to or during forming of the composite material. Moreover, with the composite material produced by this embodiment equal distribution of the thermoplastic matrix material throughout the reinforcing material is ensured.

According to an alternative embodiment, the reinforcing material is impregnated e.g., sprayed, with synthetic resin matrix material, e.g., a thermoplastic or thermosetting resin material, prior to said stitching. In this way conventional type pre-pregs can be produced which have the advantage that the orientation of the yarns or threads in the reinforcing material is known, the yarns or threads are straight with no crimps therein, and that accordingly the strength characteristics of an article formed from the composite material are of a maximum and can be predicted.

According to another embodiment of the present invention, a coating of synthetic resin matrix material, e.g., thermosetting resin material, is applied to one or both outer surfaces of the reinforcing material prior to said stitching. Said coating may be tacky and may be covered with a release paper, either before or after said stitching, until the composite material is required for use when the release paper may be removed.

According to a further embodiment of the present invention said yarns or threads of reinforcing material in at least some of said layers have incorporated or interspersed therewith said matrix material. According to one embodiment, the yarns or threads of reinforcing material have interspersed therebetween yarns or threads of thermoplastic resin material. In another embodiment, at least some of the yarns or threads of reinforcing material are coated or impregnated with a matrix material, e.g., are coated or impregnated with a matrix material in powder form which is retained in place by an outer coating or sheath, e.g., of thermoplastics material. The powder matrix material may be a thermoplastic or thermosetting resin material or a ceramic or metal material. For example, the reinforcing material may be of carbon fibre and the powder matrix material of carbon to provide a carbon/carbon composite. This again provides a composite material which is easy to handle, which can have an indefinite shelf life and which is easy to use.

The term "yarns or threads" as used herein means yarns, threads, monofilaments, rovings, tows or the like, of continuous or discontinuous fibres, as conventionally used.

Said yarns or threads of the reinforcing material are preferably of glass e.g., glass fibre, although they can, if desired, be of other suitable reinforcing materials such as carbon fibre, aramid fibre, ceramic fibre, polyethylene fibre, polyester fibre, metal or mixtures thereof.

The yarns or threads in at least two of said layers preferably extend at 90° to one another. Advantageously, the yarns or threads in at least one further layer extend at an angle of from 45° to 90° with respect to the yarns or threads in at least one of said at least two layers. Thus, for example, said layers may comprise at least a layer in which the yarns or threads extend in a first direction, a layer in which the yarns or threads extend in a second direction at 90° to the first direction, a layer in which the yarns or threads extend in a third direction at 45° to the first direction, and a layer in which the yarns or threads extend in a fourth direction at 45° to the first direction and 90° to the third direction. Such a material may be isotropic.

In at least one of said layers the yarns or threads may be laid at different densities in different parts of the layer to provide different strength characteristics in different parts of the composite material. In this way the composite material can be "engineered" to suit particular requirements.

The yarn or thread used in said stitching may be engineered or selected to assist in imparting required properties or characteristics to the composite material, e.g., desired mechanical or electrical properties. For example, the yarn or thread may be a thermoplastic material which will become part of the matrix when the composite material is formed, e.g., under heat and pressure.

Different layers of said reinforcing material and/or the matrix material in or between different layers of said reinforcing material may have different properties, e.g., different mechanical, physical or electrical properties, such as different mechanical strengths or different electrical conductivities and/or electrical resistances and/or dielectric properties, to provide a "hybrid" composite material having required properties.

If desired additional pieces or "patches" of reinforcing material may be introduced between two or more of said layers prior to said[stitching to provide additional reinforcement or thickness at selected positions in the composite material, thus enabling the composite material to be further "engineered" to suit its final application.

The present invention will be more particularly described with reference to the accompanying drawings, in which:

FIG. 1 diagramatically illustrates a method of producing a composite material according to a preferred embodiment, and FIG. 2 is a greatly enlarged cross-section of a yarn or thread used in another embodiment.

Referring to FIG. 1 of the drawings it will be seen that in the method illustrated a reinforcing material 9 is produced having a plurality of layers 1-6 superimposed upon one another. Each of the layers 1-6 comprises a plurality of unidirectional non-woven yarns or threads 10 and the yarns or threads 10 in at least some of the different layers extend in different directions as shown. Thus, as illustrated, the yarns or threads 10 in the layer 1 extend longitudinally of the reinforcing material, the yarns or threads 10 in the layer 2 extend at right angles to the yarns or threads 10 in the layer 1, the yarns or threads 10 in the layer 3 extend at 45° with respect to the yarns or threads in the layers 1 and 2, and so on as shown. It will be understood that the embodiment shown is for illustration only and that the reinforcing material can comprise any required number of layers with the yarns or threads in the different layers oriented as required. Interposed between at least two of the layers 1-6, and preferably between each of the adjacent layers 1-6, is a film or sheet of thermoplastic material 8. In addition, a sheet or film of thermoplastic material 7 is applied to one or both outer surfaces of the reinforcing material 9. The layers 1-6 of the reinforcing material 9, together with the films or sheets of thermoplastic material 7, 8, are stitched together by knitting therethrough as illustrated at 11 to form stitching 12. The stitching is such that the yarns or threads 10 in each of the layers 1-6 are held in fixed position relative to one another.

Yarns or threads 13 of thermoplastic material can be interspersed or co-mingled with the yarns or threads 10 in one or more of the layers 1-6 as illustrated at 14, either to provide additional thermoplastic material in the composite material or to replace the thermoplastic sheet or film material 7 and/or 8.

If desired, pieces or patches 15 of reinforcing material can be inserted between any of the adjacent layers 1-6 prior to said stitching, to provide additional reinforcement or thickness of a required size and shape and at required locations in the finished composite material.

Because the yarns or threads 10 in the different layers 1-6 are multi-axial and the yarns or threads 10 in the different layers are firmly held by the stitching 12, the composite material produced by the method of the present invention can be formed to complex shapes without creasing or wrinkling.

In the embodiment illustrated in FIG. 2 at least some of the yarns or threads 10 and/or the yarns or threads 13 comprise a core of reinforcing yarn or thread 16, a layer of matrix material 17 around the yarn or thread 16 and a sheath or coating 18 around the layer of matrix material 17. The core 16 may be a reinforcing yarn or thread of glass fibre, aramid fibre, carbon fibre, ceramic fibre, metal, polyester fibre, polyethylene fibre or other reinforcing material, or mixtures of two or more thereof. The matrix material 17 may be in powder or other suitable form and may comprise a thermoplastic or thermosetting resin material, ceramic, carbon, metal or other suitable matrix forming material. The sheath or coating 18 may be a thermoplastics or other suitable material. In accordance with this embodiment composite materials of various different combinations of reinforcing and matrix materials can be produced, such as glass fibre/thermosetting resin or carbon/carbon. Yarns or threads 10 according to this embodiment can be used in place of or in conjunction with the films or sheets 7 and/or 8 and/or the yarns or threads 13.

The composite material produced by the method of the present invention is formable to complex shapes whilst in the "dry" condition, i.e., whilst at room temperature and without any softening of the thermoplastic material.

When the "yarns or threads" used in the method of the present invention are monofilaments or tows, i.e., bundles of substantially parallel monofilaments, of reinforcing material or thermoplastic material, such monofilaments or tows are preferably unsized, i.e., not treated with a sizing material, to aid the intimate mixing of the filaments of reinforcing material and thermoplastic material.

At some time during the method of the present invention the monofilaments or tows of reinforcing material and thermoplastic material in each layer are agitated to effect an intimate and substantially uniform mixing of the filaments of reinforcing material and thermoplastic material in each layer. Such agitation can be effected in any suitable manner, as by jets of air directed through suitable nozzles 20 connected to a source of compressed air (not shown) as the monofilaments or tows of reinforcing material and thermoplastic material are laid, by mechanical vibration or by a combination thereof. Advantageously said agitation can be effected during the stitching of the layers together, as by knitting the layers together so that the knitting needles 11 as they pass through each layer act to agitate the filaments within that layer and so intimately and substantially uniformly mix together the filaments of reinforcing material and thermoplastic material within the layer.

If desired the proportion of reinforcing material to thermoplastic material can be varied from one layer to another to provide a formable composite material having required properties. For example, at least one outer layer of the composite material may have a higher proportion of thermoplastic material than reinforcing material, e.g., in a ratio of 80:20, to provide a good surface finish on an article produced, e.g., molded, from the composite material, whilst an inner layer or layers may have a higher proportion of reinforcing material than thermoplastic material, e.g., in a ratio of 80:20, to provide the article with required strength characteristics.

Because by the method of the present invention the filaments of reinforcing material and thermoplastic material are intimately and uniformly mixed within each :layer, articles produced, e.g. moulded, from the formable composite material are characterized by the absence of voids or unintentional resin rich areas. This is in marked contrast to woven fabrics produced from yarns or threads of reinforcing material and yarns or threads of thermoplastic material wherein the interweaving of the yarns or threads fixes their position relative to one another and prevents any intimate and uniform mixing of the filaments of reinforcing material with the filaments of thermoplastic material so that voids and resin rich areas are unavoidable.

We claim:

1. A method of producing a rigid thermoplastic composite article comprising the steps of:
   (a) simultaneously laying monofilaments or tows of a reinforcing material from first supply means side-by-side with monofilaments or tows of thermoplastic material from second supply means to form a first layer consisting of interspersed unidirectional nonbonded and nonwoven monofilaments or tows of reinforcing material and thermoplastic material in substantially parallel relationship;
   (b) simultaneously laying monofilaments or tows of a reinforcing material from third supply means side-by-side with monofilaments or tows of thermoplastic material from fourth supply means to form a second layer consisting of interspersed unidirectional nonbonded and nonwoven monofilaments or tows of reinforcing material and thermoplastic material in substantially parallel relationship;
   (c) superimposing said second layer upon said first layer with the monofilaments or tows in said second layer extending in a different direction to the monofilaments or tows in said first layer;
   (d) thereafter stitching said layers together using knitted stitches to hold said monofilaments or tows in said first and second layers in fixed relation to one another;
   (e) forming said stitched layers into a retainable complex shape at room temperature;
   (f) retaining said complex shape, and heating and cooling the same to harden said thermoplastic material to produce said rigid thermoplastic composite article; and
   (f) at some time during the process agitating the monofilaments or tows of reinforcing material and thermoplastic material in each layer to effect an intimate and substantially uniform mixing of the filaments of reinforcing material and thermoplastic material in each layer.

2. A method according to claim 1 wherein a sheet, film, tissue, ribbon or tape of woven or non-woven material is interposed between at least two of said layers, and/or is applied to at least one outer surface of the reinforcing material, and is stitched in with said layers.

3. A method according to claim 2, wherein said sheet, film, tissue ribbon or tape is of a foamed material or a polyester or other thermosetting plastics material.

4. A method according to claim 1 wherein said monofilaments or tows of reinforcing material are of glass.

5. A method according to claim 1, wherein said monofilaments or tows of reinforcing material are selected from the group consisting of glass fibre, carbon fibre, aramid fibre, ceramic fibre, metal, polyethylene and mixtures thereof.

6. A method according to claim 1 wherein the monofilaments or tows in at least two of said layers extend at 90° to one another.

7. A method according to claim 1, wherein the monofilaments or tows in at least one further layer extend at an angle of from 45° to 90° with respect to the monofilaments or tows in at least one of said at least two layers.

8. A method according to claim 1, wherein said layers comprise at least a layer in which the monofilaments or tows extend in a first direction, a layer in which the monofilaments or tows extend in a second direction at 90° to the first direction, a layer in which the monofilaments or tows extend in a third direction at 45° to the first direction, and a layer in which the monofilaments or tows extend in a fourth direction at 45° to the first direction and 90° to the third direction.

9. A method according to claim 1, wherein the composite material is isotropic.

10. A method according to claim 1, wherein in at least one of said layers the monofilaments or tows are laid at different densities in different parts of the layer to provide different strength characteristics in different parts of the reinforcing material.

11. A method according to claim 1, comprising inserting pieces or patches of reinforcing material at selected positions between said layers prior to said stitching.

12. A method according to claim 1, comprising the further step of, prior to said stitching of said layers together, laying monofilaments or tows of a reinforcing material side-by-sidle with monofilaments or tows of thermoplastic material to form at least a third layer consisting of interspersed unidirectional nonbonded and nonwoven monofilaments or tows of reinforcing material and thermoplastic material, said third layer being superimposed upon said first and second layers.

13. A method according to claim 12, wherein the monofilaments or tows in said third layer extend in a different direction to the monofilaments or tows in said first and second layers.

14. A method according to claim 12, wherein the monofilaments or tows in said third layer extend in the same direction as the monofilaments or tows in said first or second layer.

15. A method according to claim 1, wherein said agitating of the monofilaments or tows of reinforcing material and thermoplastic material is effected by the action of stitching said layers together.

16. A method according to claim 1, wherein said agitating of the monofilaments or tows of reinforcing material and thermoplastic material is effected by jets of air during the laying of the monofilaments or tows of reinforcing material and thermoplastic material.

* * * * *